United States Patent [19]

Yoshihiko

[11] Patent Number: 4,517,609
[45] Date of Patent: May 14, 1985

[54] VIDEO SIGNAL RECORDING APPARATUS
[75] Inventor: Ota Yoshihiko, Yokohama, Japan
[73] Assignee: Victor Company of Japan, Ltd., Yokohama, Japan
[21] Appl. No.: 445,658
[22] Filed: Nov. 30, 1982
[30] Foreign Application Priority Data
Dec. 18, 1981 [JP] Japan .................. 56-204867
[51] Int. Cl.³ .......................... H04N 5/78; G11B 5/02
[52] U.S. Cl. ..................... 360/22; 360/19.1; 360/21; 360/24; 360/23
[58] Field of Search ............... 360/21, 22-24, 360/19.1, 18; 358/335, 341, 343

[56] References Cited
U.S. PATENT DOCUMENTS
3,465,098  9/1969  Iwai et al. ................ 360/24
3,838,446  9/1974  Otsuka et al. ............ 360/19.1 X Primary Examiner—Robert L. Richardson
Attorney, Agent, or Firm—Louis Bernat

[57] ABSTRACT

A video signal recording apparatus comprises a guiding mechanism for guiding a magnetic tape, and a main head and a sub-head for scanning and recording a composite video signal throughout a predetermined range of the magnetic tape. The main head and the sub-head is separated by a predetermined angle and mounted on a rotary body with a difference in their height positions. The main head scans over the magnetic tape to record a signal by forming a first track part comprising a plurality of tracks formed obliquely with respect to the longitudinal direction of the magnetic tape, in a first region along the width direction of the magnetic tape, while the sub-head scans over the magnetic tape to record a signal by forming a second track part comprising a plurality of tracks formed obliquely with respect to the longitudinal direction of the magnetic tape, in a second region different from the first region along the width direction of the magnetic tape.

8 Claims, 19 Drawing Figures

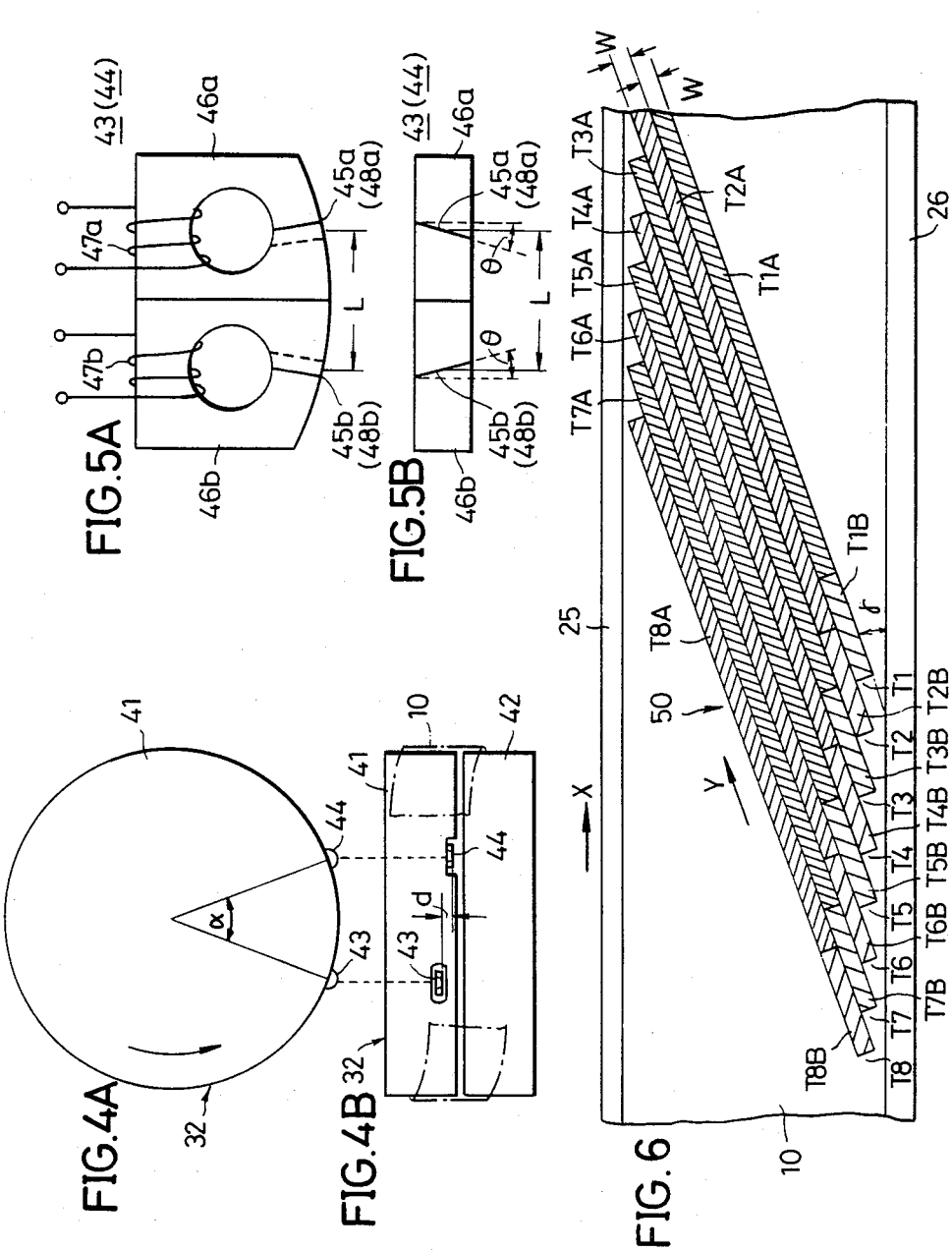

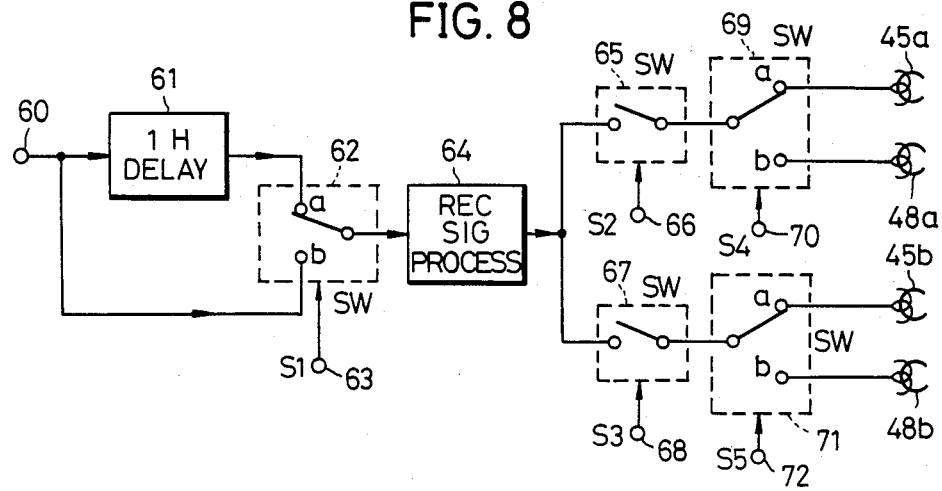
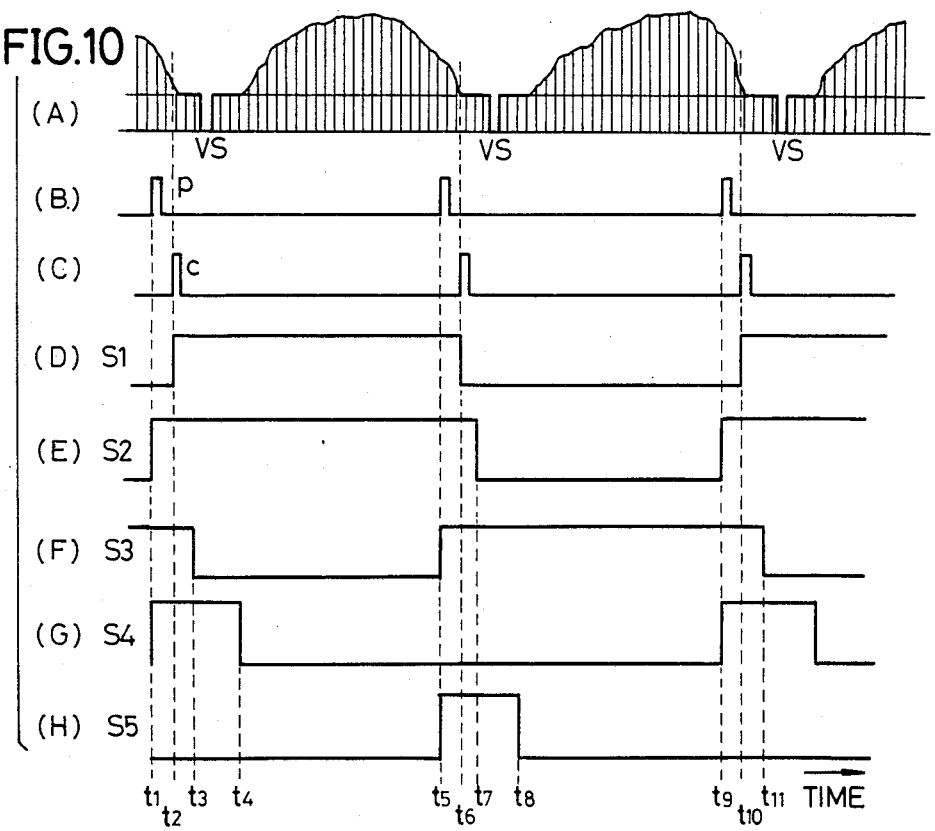

VIDEO SIGNAL RECORDING APPARATUS

BACKGROUND OF THE INVENTION

The present invention generally relates to video signal recording apparatuses, and more particularly to a video signal recording apparatus which employs a system for recording a main video signal part of a composite video signal onto a magnetic tape by a main head and records a signal part including other signals such as a vertical synchronizing signal onto the magnetic tape by a sub-head, in which the recording is carried out so that reproduction can also be carried out by a standardized apparatus of a standard type wherein the reproduction is carried out alternately by two main heads.

Presently, video signal recording and/or reproducing apparatuses using tape cassettes are reduced to practical use on a world-wide basis. As types of these recording and/or reproducing apparatuses using tape cassettes, standardized apparatuses of two or three standard types presently exist world-widely. There is no interchangeability among apparatuses of different standards, however, interchangeability exists among apparatuses adopting the same standard. Accordingly, a tape cassette recorded by one recording and/or reproducing apparatus can be reproduced by another recording and/or reproducing apparatus of the same standard. Hence, in order to ensure interchangeability among different recording and/or reproducing apparatuses manufactured by different manufacturers so as to carry out recording and/or reproduction, a standardization is set with respect to formats of the tape cassette and the recording and/or reproducing apparatus. That is, the above formats are standardized for each standard, and a standard type tape cassette and a standard type recording and/or reproducing apparatus are respectively provided and employed for each standard.

In the above standard type recording and/or reproducing apparatus, a magnetic tape is caused to travel in a state where the magnetic tape is wrapped obliquely around a guide drum making contact with the guide drum for an angular range slightly larger than 180°. Two rotary heads are provided at mutually diametrical positions of a rotary body such as a rotary drum or a rotary head bar, and a so-called two-head system is employed wherein a video signal is recorded onto and reproduced from tracks formed obliquely with respect to the longitudinal direction of the magnetic tape by the two rotary heads.

Among the standard type apparatuses, a typical standard apparatus proposed by the present assignee is widely used. In this typical standard type apparatus, the two rotary heads are so-called azimuth heads having mutually opposite azimuth angles, and the tracks formed by these heads are in contiguous contact without guard bands formed therebetween. Further, a standardization is set with respect to the tape width, track inclination, track width (track pitch), diameter of the guide drum (cylinder), and the like.

Recently, a problem of much importance involves the realization in downsizing the recording and/or reproducing apparatus main body. This is to realize a more compact portable type recording and/or reproducing apparatus, and, for example, to realize such an equipment that a recording apparatus is unitarily built into a television camera. In order to downsize the apparatus main body, it becomes necessary to downsize the guide drum which occupies a large part within the apparatus.

If the diameter of the guide drum can be set small, the area occupied by the guide drum can be reduced, and further, a mechanism for drawing out the tape from the tape cassette and causing the tape to make contact with the guide drum can be designed as a small mechanism.

However, in the above two-head system, the tape pattern will change if the diameter of the guide drum is reduced, and the interchangeability cannot be obtained. In addition, the scanning length (track length) of each head over the magnetic tape becomes shorter. As a result, unless the precondition for recording one field of video signal on one track is changed, the relative speed of the head with respect to the tape becomes reduced, the signal-to-noise ratio is greatly reduced, and it becomes impossible to carry out satisfactory recording and reproduction. Accordingly, it is in reality impossible to reduce the diameter of the guide drum in the apparatus of the two-head system.

In this regard, some attempts have been made to realize a compact type recording and/or reproducing apparatus which uses a tape pattern and format completely different from those of the standard type recording and/or reproducing apparatus. In one of such attempts, the apparatus only uses a single rotary head, and the magnetic tape is caused to travel in a state where the tape is wrapped around the guide drum for an angular range of 360°. In this so-called one-head system, it becomes possible to reduce the diameter of the guide drum to one-half that of the above apparatus of the two-head system. However, dropout is introduced in the recorded video signal when the single head scans over the tape wrapped around the guide drum exceeding one side edge and the other side edge of the tape. Particularly if tracks for a control signal and an audio signal are formed at the side edges of the tape, there was a disadvantage in that dropout is introduced in the video signal at these parts. Moreover, because only a single head is used, a so-called overlap recording in which the same signal is recorded overlapping at a terminal end of one track and a starting end of an adjacent track cannot be carried out in essence. Hence, also from this point of view, there was a disadvantage in that a continuous reproduced signal having no dropout cannot be obtained upon reproduction. Therefore, this apparatus of the one-head system was never developed to a stage for reduction into practical use.

An apparatus of the so-called 1.5-head system was thus proposed as a system eliminating the disadvantages of the above one-head system. In the apparatus of the 1.5-head system, the magnetic tape is wrapped around the guide drum for an angular range slightly smaller than 360°. A large portion of the video signal within the composite video signal is recorded onto the tape by a main head, and a sub-head records the remaining signal portion including the vertical synchronizing signal onto the tape during a period in which the main head does not make contact with the tape.

According to the above apparatus of the 1.5-head system, the diameter of the guide drum can be made to one-half that of the two-head system, as in the case of the one-head system, to enable downsizing of the apparatus. Furthermore, the 1.5-head system was advantageous in that the recording and reproduction can be carried out without introducing dropout in the signal. However, the format of the tape pattern and the like of the conventional 1.5-head system completely differs from the format of the standard type apparatus of the standardized two-head system described previously. For example, in the standard type apparatus of the two-head system, azimuth heads are used to form tracks in contiguous contact with each other. On the other hand, in the apparatus of the 1.5-head system, azimuth heads are not used, and the tracks are formed with unrecorded guard bands formed therebetween. For this reason, there was a disadvantage in that the magnetic tape recorded by the apparatus of the 1.5-head system cannot be reproduced by the standard type apparatus of the two-head system.

SUMMARY OF THE INVENTION

Accordingly, it is a general object of the present invention to provide a novel and useful video signal recording apparatus in which the above described disadvantages have been overcome.

Another and more specific object of the present invention is to provide a video signal recording apparatus designed so that a signal recorded by this apparatus can be reproduced by an apparatus of the two-head system, by modifying the conventional apparatus of the so-called 1.5-head system. According to the apparatus of the present invention, the diameter of a drum can be made to one-half that of the apparatus of the two-head system, to enable downsizing of the apparatus as a whole. In addition, a magnetic tape recorded by the apparatus of the present invention can be reproduced by a standard type apparatus of the two-head system which is presently being used widely. Hence, an outdoor image can be picked up by the apparatus of the present invention of a portable type or a type unitarily built into an image pickup camera, for example, and the recorded tape may be reproduced at home by a stationary standard apparatus of the two-head system, for instance.

Other objects and further features of the present invention will be apparent from the following detailed description when read in conjunction with the accompanying drawings.

BRIEF DESCRIPTION OF THE DRAWINGS

FIGS. 4A and 4B are a plan view and an elevation, respectively showing a guide drum for explaining the mounting positions of rotary magnetic heads in the apparatus according to the present invention;

FIGS. 5A and 5B are a plan view and a front view, respectively showing one rotary magnetic head in the apparatus according to the present invention;

FIG. 6 is a diagram showing a track pattern on a magnetic tape recorded by the apparatus according to the present invention;

FIG. 8 is a systematic block diagram showing an embodiment of a recording signal switching and supplying circuit for the rotary magnetic heads in the apparatus according to the present invention;

FIGS. 10(A) through 10(H) are graphs respectively showing signal waveforms at each part of the block systems shown in FIGS. 8 and 9.

DETAILED DESCRIPTION

Figure 1:
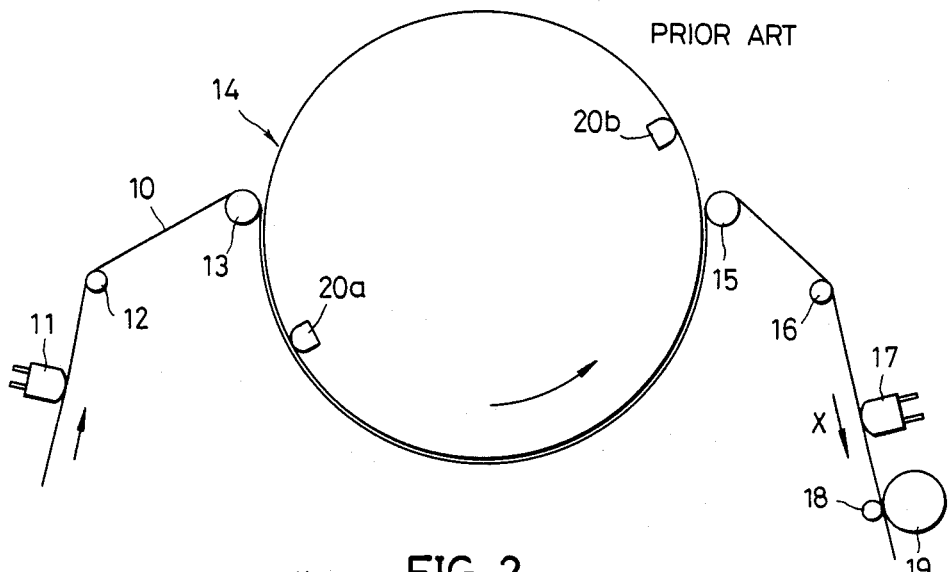
FIG. 1 is a general plan view showing an essential part of a standardized video signal recording and/or reproducing apparatus of the standard type presently being used widely, which is capable of reproducing a tape recorded by a video signal recording apparatus according to the present invention.

First, description will be given with respect to a standardized video signal recording and/or reproducing apparatus of the standard type by which a tape recorded by the apparatus according to the present invention is to be reproduced, by referring the FIG. 1. A magnetic tape 10 is guided by guide poles 12 and 13 after making contact with a full-width erase head 11, and then obliquely and spirally makes contact with a guide drum 14 for an angular range which is restricted by guide poles 13 and 15 and is slightly larger than 180°. After making contact with the guide drum 14, the tape 10 is guided by guide poles 15 and 16 and makes contact with a magnetic head 17 for recording and reproducing an audio signal and a control signal. The tape 10 is pinched between a capstan 18 and a pinch roller 19, and is caused to travel in the direction of an arrow X.

The guide drum 14 comprises a rotary upper drum and a stationary lower drum, and a pair of video heads 20a and 20b are diametrically mounted on the rotary upper drum. As the rotary upper drum is rotated at a speed of 30 rpm, tracks are alternately formed on the tape 10 by the heads 20a and 20b, in a track pattern shown in FIG. 2 wherein one field of video signal is recorded on one track. Because the tape 10 makes contact with the guide drum 14 for an angular range slightly larger than 180°, there are periods in which both the heads 20a and 20b make contact with and record on the tape 10. Accordingly, the same signal is recorded in an overlapping manner at a terminal end of one track and a starting end of an adjacent track, that is, a so-called overlap recording is carried out.

Figure 2:
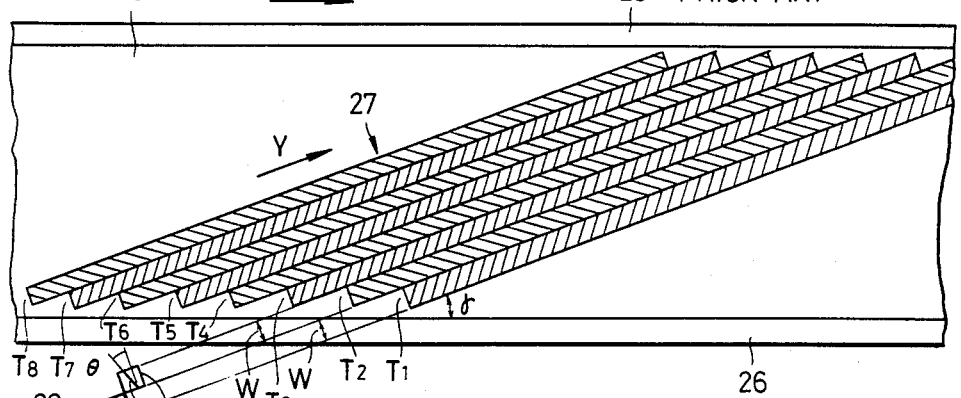
FIG. 2 is a diagram showing a track pattern on a tape which is subjected to recording and reproduction by the apparatus shown in FIG. 1.

FIG. 2 shows the track pattern recorded and formed by the apparatus shown in FIG. 1. At the upper and lower ends of the tape 10, an audio signal track 25 and a control signal track 26 respectively formed and recorded by the head 17 extend along the longitudinal direction of the tape 10. A plurality of video tracks 27 having a predetermined inclination angle $\gamma$ with respect to the longitudinal direction of the tape, are obliquely formed between the tracks 25 and 26. As shown in FIG. 2, the heads 20a and 20b respectively have azimuth gaps 28a and 28b inclined by an angle in mutually opposite directions. Accordingly, tracks T1, T2, T3, . . . of the video tracks 27 are tracks alternately recorded by the heads 20a and 20b. Even if one head 20a (or 20b) scans over the track formed by the other head 20b (or 20a) due to tracking error (that is, when a so-called reverse tracking occurs), for example, substantially no signal is reproduced at the part scanned under the reverse tracking due to the azimuth loss of the head gap. For this reason, the tracks can be formed in contiguous contact with each other, without providing guard bands between the adjacent tracks. The width of the tape 10, the track width W, the track inclination angle $\gamma$, the azimuth angle $\theta$, and the like are standardized and determined according to a standard.

Figure 3:
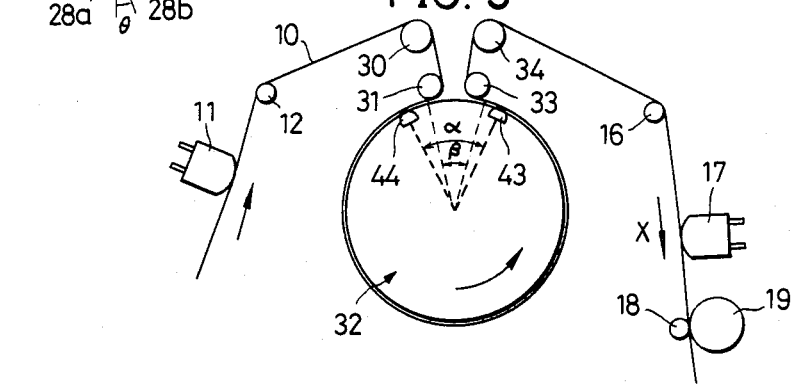
FIG. 3 is a general plan view showing an essential part of an embodiment of a video signal recording apparatus according to the present invention.

Next, description will be given with respect to a video signal recording apparatus according to the present invention in which the diameter of the guide drum is set to one-half that of the above described standard type apparatus, a track pattern substantially equivalent to that shown in FIG. 2 is formed, and the video signal is recorded onto the tape so that the video signal can be reproduced by the standard type apparatus shown in FIG. 1, by referring to FIG. 3 and the succeeding drawings. In FIG. 3, those parts which are the same as those corresponding parts in FIG. 1 are designated by the same reference numerals, and their description will be omitted. The tape 10 is guided by guide poles 12, 30, and 31 and then obliquely and spirally makes contact with a guide drum 32 by an angular range excluding an angle β restricted by guide poles 31 and 33. Because the traveling direction of the tape 10 is changed by the guide poles 31 and 33 and the tape 10 separates from the guide drum 32, it is in reality impossible to set the angle β to zero.

The guide drum 32 has a diameter which is one-half that of the standard type apparatus shown in FIG. 1, and as shown in FIGS. 4A and 4B, the guide drum 32 comprises a rotary upper drum 41 and a stationary lower drum 42. A main head 43 and a sub-head 44 are mounted at the periphery of the rotary upper drum 41 with an angle α formed therebetween. The rotary upper drum 41 is rotated counterclockwise as indicated by an arrow in FIG. 3, at a rotational speed of 30 rpm. The main head 43 is mounted on the rotary upper drum 41 at a height position higher than that of the subhead 44 by a distance d. The angle α is larger than the angle β. Accordingly, even if one of the heads 43 and 44 is within the range of the angle β, the other head is outside the range of the angle β and makes contact with the tape 10. The angle α and the distance d are determined as will be described hereinafter. Theoretically, during a period in which the main head 43 is within the range of the angle β and does not make contact with the tape 10, the sub-head 44 makes contact with the tape 10, and the recording is carried out by the sub-head 44.

The heads 43 and 44 have the same construction. Hence, in FIGS. 5A and 5B, description will be given only with respect to the main head 43. The main head 43 comprises two azimuth gaps 45a and 45b arranged with a gap L along the rotational direction thereof, on cores 46a and 46b of the main head 43. The azimuth angles of the azimuth gaps 45a and 45b are equal to θ in mutually opposite directions, and are equal to the azimuth angles of the heads 20a and 20b of the standard type apparatus described before. Coils 47a and 47b are respectively wound around the cores 46a and 46b. As will be described hereinafter, a signal is selectively applied to the coils 47a and 47b, and the gaps 45a and 45b selectively carry out recording of the above signal onto the tape 10. In the embodiment shown, the gap 45a is provided at a position leading the gap 45b along the rotational direction of the heads, and the height positions of the gaps 45a and 45b are the same. The sub-head 44 also comprises azimuth gaps 48a and 48b similar to the above gaps 45a and 45b.

A track pattern formed on the tape 10 when the signal is recorded by the above described rotary magnetic head device, is shown in FIG. 6. The audio signal track 25 and the control signal track 26 are formed at the upper and lower ends of the tape 10 by the head 17, as in the tape pattern shown in FIG. 2. A plurality of video tracks 50 having a predetermined inclination angle γ is formed obliquely with respect to the longitudinal direction of the tape 10, between the tracks 25 and 26.

The video tracks 50 comprises a plurality of tracks T1, T2, T3, ... formed in contiguous contact with each other and having a width determined by the track width of the gaps of the heads 43 and 44. The inclination angle γ, the track width W, and the like of the tracks T1, T2, T3, ... are the same as those of the track pattern obtained by the standardized two-head system described before. Each track T1 (T2, T3, ... ) comprises a first track part T1A (T2A, T3A, ... ) recorded by the main head 43, and a second track part T1B (T2B, T3B, ... ) recorded by the sub-head 44. The track parts T1A (T2A, T3A, ... ) and T1B (T2B, T3B, ... ) are continuous.

In addition, assuming that the track part T1B of the track T1 is formed by the gap 48a of the head 44, the track part T1A is formed by the gap 45a of the head 43. In this case, the track part T2B of the adjacent track T2 is formed by the gap 48b of the head 44, and the track part T2A is formed by the gap 45b of the head 43. The tracks T3, T5, ... whose suffix is odd are recorded similarly as the track T1, and the tracks T4, T6, ... whose suffix is even are recorded similarly as the track T2. Accordingly, the tracks T1, T3, T5, ... are formed by the azimuth gaps 45a and 48a along one direction throughout the whole track, and the tracks T2, T4, T6, ... are formed by the azimuth gaps 45b and 48b along the other direction throughout the whole track.

Therefore, each of the tracks T1, T2, ... in the track pattern shown in FIG. 6 formed by the apparatus according to the present invention respectively comprise two track parts, each of the tracks as a whole is formed by the gaps of the same azimuth angle. Moreover, each of the adjacent tracks are alternately formed by the gaps of different azimuth angles. As a result, the tracks T1, T2, ... in the track pattern shown in FIG. 6 are substantially equivalent to the tracks T1, T2, ... in the track pattern shown in FIG. 2 formed by the standard type apparatus, and the tape having the track pattern shown in FIG. 6 may be reproduced by the standard type apparatus without introducing problems.

Because the height positions of the heads 43 and 44 differ by the distance d, the starting end of the scanning carried out by the head 43 and the starting end of the scanning carried out by the head 44 along the width direction of the tape 10 become shifted with respect to each other, so as to enable the formation of one track from the first track part and the second track part (if the height positions of the heads 43 and 44 are the same, the starting ends of the scanning carried out by the heads 43 and 44 only shift along the longitudinal direction of the tape 10, and not along the width direction of the tape). Hence, when recording the signal of the same field, one first track part formed by the head 43 and one second track part formed by the head 44 are separated by a certain number of tracks. Thus, in each track, the first track part (T1A, T2A, ... ) recorded by the head 43 and the second track part (T1B, T2B, ... ) of the same track recorded by the head 44 are not signals of the same field, and are signals of fields different by a certain number of fields. However, the video signal of each field of the composite video signal may be recorded on the first track part by the head 43, and the vertical synchronizing signal may be recorded on the second track part by the head 44, and further, the recording may be carried out so that the signals recorded on the first track parts and the second track parts respectively are of the same type of fields, that is, even and odd fields, in the same track. By taking these measures, no undesirable effects are introduced in the reproduced picture even when the heads of the standard type apparatus continuously scan over the first and second track parts of each track.

Next, description will be given with respect to the selection of the angle α and the distance d for forming the track pattern shown in FIG. 6, by referring to FIG. 7. As described before, the following conditions need to be satisfied in order for the track pattern on the tape shown in FIG. 6 to be equivalent to the track pattern shown in FIG. 2.

(1) The azimuth angles of the head gaps which form the first track part and the second track part of the same track are the same, and the adjacent tracks are alternately formed by head gaps of different azimuth angles.

(2) The signals recorded on the first track part and the second track part of the same track are of the same type of fields, that is, even and odd fields, and the signals recorded on the adjacent tracks are alternately of the odd and even fields.

(3) The order of the horizontal scanning periods (the order of the horizontal scanning line numbers) is continuous in the first track part and the second track part of the same track, and the length of the horizontal scanning period on the tape including the joint between the first and second track parts is the same as the length of the horizontal scanning periods at other parts on the tape.

(4) The height positions of the joints between the first and second track parts of each of the tracks along the tape width direction are aligned.

(5) The order of the chrominance signal format for every horizontal scanning period is aligned when the video signal to be recorded is a color video signal of the PAL system or the SECAM system.

Figure 7:
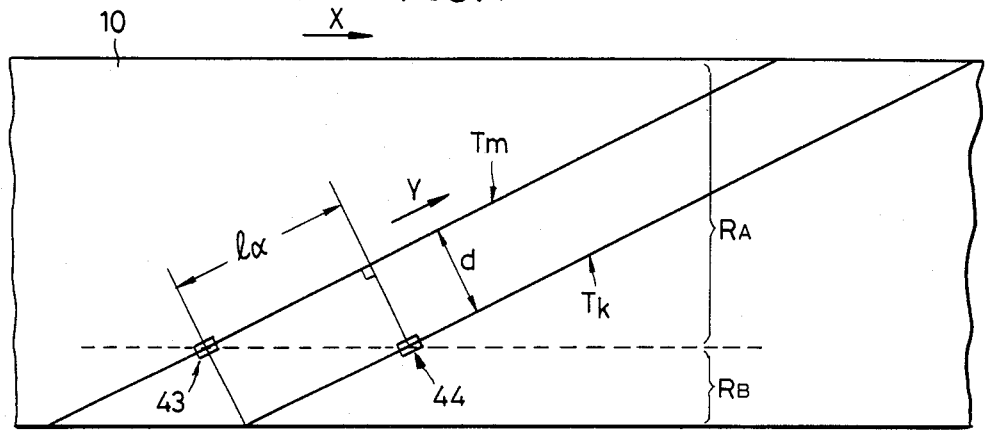
FIG. 7 is a diagram for explaining how the mounting positions of the rotary magnetic heads are selected according to the track pattern.

In FIG. 7, a region RA along the width direction of the tape 10 indicates a recording region of the main head 43, and a region RB indicates a recording region of the sub-head 44. One field of the composite video signal is recorded on one track by adding the first and second track parts within the regions RA and RB. When the main head 43 is at the starting end of the region RA, the sub-head 44 is at the terminal end of the region RB. A distance d along the track width direction (a direction perpendicular to the longitudinal direction of the track) between the heads 43 and 44 in FIG. 7, is equal to the distance d corresponding to the difference in mounting height positions of the heads 43 and 44 on the rotary upper drum 41. A distance lα along the longitudinal direction of the track corresponds to the angle α between the heads 43 and 44.

It will be assumed that tracks Tm and Tk are tracks on extensions of loci over which the heads 43 and 44 respectively scan. The recording magnetization direction of these tracks Tm and Tk are the same (that is, recorded by heads of the same azimuth angle), and the relationship between the type of fields of the video signal recorded on these tracks Tm and Tk must be such that the fields are of the same type, that is, both even or odd fields. Hence, odd number of tracks must be recorded between the tracks Tm and Tk. In other words, the distance d between the tracks Tm and Tk must be a distance equal to an even multiple of the track pitch of the oblique tracks.

In addition, the number of horizontal scanning periods recorded on a track part having a length corresponding to the distance lα, is determined according to the number of tracks within the above distance d and the number of shifts in the order of the horizontal scanning periods recorded on two adjacent tracks (so-called H-shifts).

More detailed description will be given by use of numerical values of the present embodiment. The numerical values in the present embodiment are set as follows according to the above standard.

Inclined track pitch P=0.06 mm

Number of H-shifts k=1.5H where H represents one horizontal scanning period

Angle of non-contact period between tape and head β=25° Although the angle β is in the order of 25°, the angle α is set in the order of 30° for comfort. As a result, the number of horizontal scanning periods NH recorded on the track part having a length corresponding to the distance lα within the mounting angle of the head in the order of 30°, becomes in the order of 22H. The number of horizontal scanning periods NH is equal to the product of the track pitch number d/P of the track included within the distance d and the Number of H-shifts k. As described before, the track pitch number d/P of the track included within the distance d must be even, but since d/P is equal to NH/k from the above described relationship, NH/k must also be even. Therefore, if NH is set to 24H by considering the above, NH/k=24/1.5=16, and NH/k accordingly becomes even. The distance d can be determined by the following equation.

$$d = P \cdot NH/k = 0.06 \times 16 = 0.96 \text{ mm}$$

It is desirable to set the multiple of the track pitch within the distance d to a multiple of four in the PAL system or SECAM system color video signal recording apparatus, in order to align the order of the horizontal scanning periods of the chrominance signal format. In the above case, because the number of horizontal scanning periods recorded on a track part having a length corresponding to the distance lα of one oblique track is set to 24H, the angle α between the head 43 and 44 becomes α=24/262.5×360=32.9°.

In the above case, the angle α and the distance d corresponding to the difference in height positions, are determined from the tracks in the tape pattern. However, it is actually necessary to determine these values from the angle and distance on the rotary drum. In this case, the values may be determined by drawing the pattern of the scanning loci of the heads (the pattern is the same as the track pattern on the tape when the tape travel is stopped). The angle α determined by the pattern of the scanning loci of the heads becomes α=24/(262.5+k)×360=32.7°. The result obtained in this case become slightly smaller than the 32.9° obtained by the previous method. Similarly, the distance d corresponding to the difference in height positions between the heads 43 and 44 obtained from the drawing also becomes slightly smaller than the value obtained by the previous method, but because there is substantially no difference between the two values, description thereof will be omitted.

When reducing the distance L between the gaps 45a and 45b (gaps 48a and 48b) of the head 43 (44), it is subject to limitations introduced upon manufacturing of the head. The distance L is preferably set to a recording length equal to one horizontal scanning period or 0.5 horizontal scanning period on the tape pattern. The recording length of one horizontal scanning period is in the order of 0.37 mm, for example. The distance L is set in relation to the horizontal scanning period, because during a signal processing which will be described hereinafter, it becomes necessary to delay the video signal recorded by the gaps 45a and 45b of the head 43 in order to match the recording position with the video signal recorded by the gaps 48a and 48b of the head 44. It is relatively easy to construct a circuit for effecting delay of one horizontal scanning period or 0.5 horizontal scanning period, however, a delay element for effecting other delay times cannot be constructed with ease. Provided that a delay circuit for effecting delay by an arbitrary delay time can be obtained, the distance L is not limited to the value used in the present embodiment, and may be set to other values according to the delay time.

Next, description will be given with respect to a circuit system for selectively switching and operating the gaps 45a, 45b, 48a, and 48b of the heads 43 and 44 to record, by referring to FIG. 8. In FIG. 8, a composite video signal shown in FIG. 10(A) which is to be recorded, is applied to an input terminal 60. The composite video signal is supplied to one horizontal scanning period (1H) delay circuit 61 on one hand wherein the signal is delayed by one horizontal scanning period, and then supplied to a contact a of a switching circuit 62. On the other hand, the composite video signal is also applied directly to a contact b of the switching circuit 62. A movable contact of the switching circuit 62 is switched over to connect to the contact a or b, according to a switching signal S1 obtained through a terminal 63. In the present embodiment of the invention, the distance L between the gaps of the head 43 (44) is selected to be equal to the recording length of one horizontal scanning period.

Figure 9:
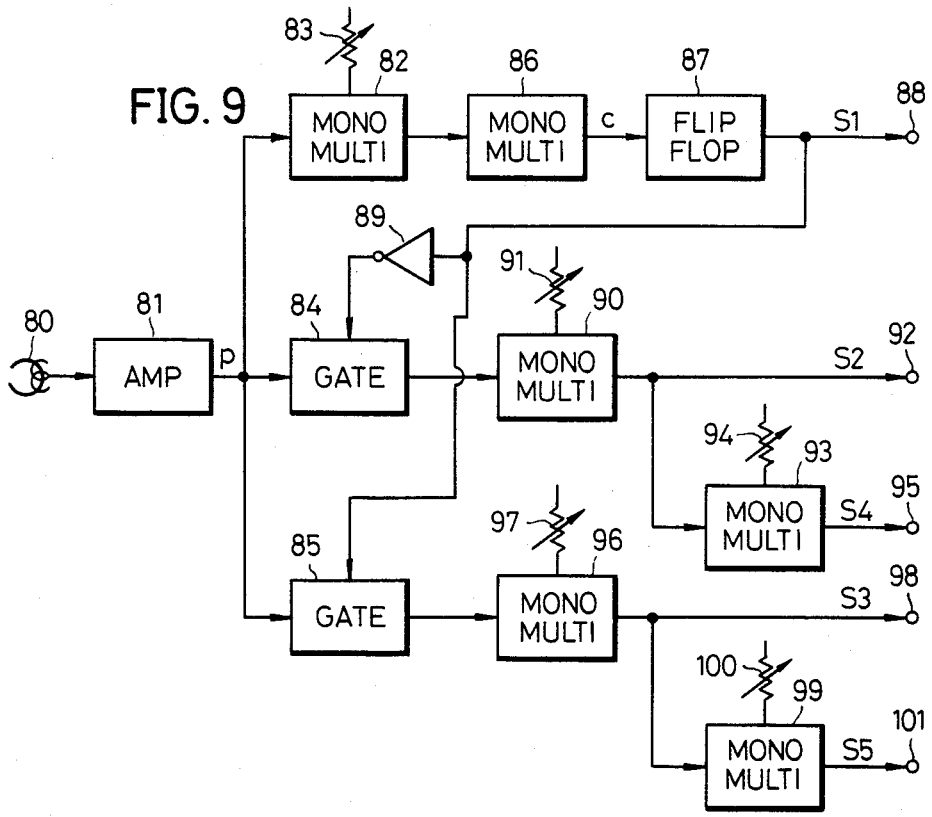
FIG. 9 is a systematic block diagram showing an embodiment of a circuit which forms a switching signal to be supplied to the switching circuit shown in FIG. 8.

On the other hand, a rotation detection pulse p shown in FIG. 10(B) is obtained for every one rotation of the rotary upper drum 41, by known rotation detection means comprising a magnet provided on a rotary body which rotates unitarily with the rotary upper drum 41 and a pickup head 80 shown in FIG. 9. The rotation detection pulse p is supplied to a monostable multivibrator 82 and gate circuits 84 and 85, through an amplifier 81. The time constant of the monostable multivibrator 82 is set by a variable resistor 83. Accordingly, a pulse c shown in FIG. 10(C) which rises at a time t2 which is delayed by a predetermined time with respect to a rise time t1 of the detection pulse supplied through monostable multivibrators 82 and 86, can thus be obtained. This pulse c is supplied to a flip-flop circuit 87 which produces a switching signal S1 shown in FIG. 10(D). The switching signal S1 is applied to the terminal 63 through a terminal 88. The above switching signal S1 alternately and repeatedly assumes high level and low level, for every period the rotary upper drum 41 requires to undergo one rotation (this period corresponds to one field period). The switching circuit 62 is connected to the contact a during the high-level period of the switching signal S1 (between times t2 and t6), and connected to the contact b during the low-level period of the switching signal S1 (between times t6 and t10).

The composite video signal obtained from the switching circuit 62, comprising the signal delayed by 1H for every one field period and the signal which is not delayed, is supplied to a recording signal processing circuit 64 wherein a known signal processing is carried out to convert the composite video signal into a signal format identical to that recorded by the standardized apparatus of the standard type. That is, the composite video signal is separated into the luminance signal and the carrier chrominance signal, the luminance signal is frequency-modulated, and the carrier chrominance signal is frequency-converted into a band lower than that of the frequency modulated luminance signal. When the carrier chrominance signal is frequency-converted, the phase is successively shifted by 90° in one direction for every one horizontal scanning period with respect to the even fields, and the phase is successively shifted by 90° in the reverse direction for every one horizontal scanning period with respect to the odd fields. Details on the above signal processing can be found in the U.S. Pat. No. 4,178,606 entitled "COLOR VIDEO SIGNAL RECORDING AND/OR REPRODUCING SYSTEM" issued Dec. 11, 1979.

In FIG. 8, the output signal of the recording signal processing circuit 64 is supplied to switching circuits 65 and 67. The switching circuits 65 and 67 are switched to open or close according to switching signals from terminals 66 and 68. In FIG. 9, the output signal of the flip-flop circuit 87 shown in FIG. 10(D) is supplied to the gate circuit 84 through an inverter 89 on one hand, and supplied directly to the gate circuit 85 on the other. The gate circuits 84 and 85 pass the rotation detection pulse p during the high-level period of the signal supplied thereto. The rotation detection pulse p passed through the gate circuit 84 and 85, are respectively supplied to monostable multivibrators 90 and 96. The time constant of the monostable multivibrator 90 is set by a variable resistor 91. The monostable multivibrator 90 produces a switching signal S2 shown in FIG. 10(E) which assumes high level between times t1 and t7 and assumes low level between times t7 and t9 according to the rise in the incoming pulse. This switching signal S2 is applied to the terminal 66 through a terminal 92. Similarly, the time constant of the monostable multivibrator 96 is set by a variable resistor 97. The monostable multivibrator 96 hence produces a switching signal S3 shown in FIG. 10(F) which assumes low level between times t3 and t5 and assumes high level between times t5 and t11 according to the rise in the incoming pulse. The switching signal S3 thus obtained, is applied to the terminal 68 through a terminal 98. The switching circuits 65 and 67 are switched to close during the high-level period of the switching signal applied thereto.

In FIG. 8, the recording signals which pass through the switching circuits 65 and 67 during the period in which the switching circuits 65 and 67 are closed, are respectively supplied to switching circuits 69 and 71. The connections of the switching circuits 69 and 71 are respectively switched over between contacts a and b according to switching signals obtained through terminals 70 and 72. The coils wound around the cores forming the gap 45a of the main head 43 and the gap 48a of the sub-head 44, are respectively connected to the contacts a and b of the switching circuit 69. Similarly, the coils wound around the cores forming the gap 45b of the main head 43 and the gap 48b of the sub-head 44, are respectively connected to the contacts a and b of the switching circuit 71.

In FIG. 9, the output signals of the monostable multivibrators 90 and 96 are respectively supplied to monostable multivibrators 93 and 99. The time constant of the monostable multivibrator 93 is set by a variable resistor 94. The monostable multivibrator 93 produces a switching signal S4 shown in FIG. 10(G) which assumes high level between times t1 and t4 and assumes low level between times t4 and t9, according to the rise in the switching signal S2 shown in FIG. 10(E). The switching signal S4 thus obtained, is applied to the terminal 70 through a terminal 95. On the other hand, the time constant of the monostable multivibrator 99 is set by a variable resistor 100. The monostable multivibrator 99 produces a switching signal S5 shown in FIG. 10(H) which assumes high level between times t5 and t8 according to the rise in the switching signal S3 shown in FIG. 10(F). This switching signal S5 is applied to the terminal 72 through a terminal 101. The switching circuits 69 and 71 are connected to the contact b during the high-level period of the switching signals S4 and S5 respectively applied thereto, and connected to the contact a during the low-level period of the switching signals S4 and S5 respectively supplied thereto. During the period in which the switching circuits 69 and 71 are connected to the respective contact b, corresponds to the vertical blanking period including the vertical synchronizing signal VS of the composite video signal shown in FIG. 10(A) and predetermined periods before and after the vertical synchronizing signal VS, and the periods in the vicinity of the vertical blanking period.

Due to the circuit operations described above, between times t2 and t4, the vertical synchronizing signal within the composite video signal delayed by 1H at the delay circuit 61 and the horizontal synchronizing signal within the vertical blanking period before and after the vertical synchronizing signal, are recorded on the second track part of one track within the region RB by the gap 48a of the sub-head 44. Then, continuously thereafter between times t4 and t6, the video information signal part within the composite video signal delayed by 1H, is recorded on the first track part of one track within the region RA, by the gap 45a of the main head 43. Next, between times t6 and t8, the signal within the vertical blanking period of the undelayed composite video signal is recorded on the second track part of another track, by the gap 48b of the sub-head 44. Further, between times t8 and t10, the video information signal part within the undelayed composite video signal is recorded on the first track part of another track, by the gap 45b of the main head 43. Thereafter, the above operations are repeated periodically.

The tracks recorded in the manner described above constitute the track pattern shown in FIG. 6. The so-called overlap recording is carried out, so that the starting end of the second track part and the terminal end of the first track part corresponding to that second track part are recorded to overlap for a part of the vertical blanking period.

As described above, the tape 10 recorded with the tape pattern shown in FIG. 6 may be reproduced by the standard type apparatus shown in FIG. 1, but it is of course possible to reproduce this tape 10 by the apparatus according to the present invention shown in FIG. 3. In this case, a delay circuit identical to the 1H-delay circuit 61 is required in the circuit within the reproducing system. In the reproducing system, it becomes necessary to carry out switching of signals so that the signal delayed by 1H is passed as it is and the undelayed signal is passed through the 1H-delay circuit.

If the apparatus according to the present invention is to be designed to be compatible with another standardized apparatus of a standard type wherein one head comprises gaps with azimuth and the other head comprises gaps with no azimuth, for example, the gaps 45a and 48a of the heads 43 and 44 may be designed to be azimuth gaps, and the gaps 45b and 48b may be designed to be normal gaps comprising no azimuth.

In the apparatus according to the present invention, one track is recorded and formed time-sequentially by the main head 43 which records a large part of the video signal and the sub-head 44 which records the vertical blanking periods, however, the recording timings of these heads 43 and 44 are different. The shift in the recording timing is determined by the number of tracks included within the range of the distance d corresponding to the relative height difference between the two heads. In the present embodiment, the number of tracks is sixteen, and the shift in the recording timing becomes equal to 0.27 ($=16 \times 1/60$) seconds.

The above shift in the recording timing is not a problem when the recording is carried out continuously, but becomes a problem at the starting point and the terminal point of the recording. That is, at the starting point of the recording, the recording track of the main head 43 does not exist for 0.27 seconds along the extension of the recording track of the sub-head 44. In addition, in the range between the terminal point of the recording and 0.27 seconds before the terminal point of the recording, the recording track of the sub-head 44 does not exist along the extension of the recording track of the main head 43. That is, when starting a recording after the end of the previous recording, there is a possibility that the vertical synchronizing signal and the main video signal are in irregular relationship with each other for the time period of 0.27 seconds.

Accordingly, in order to prevent this phenomenon from happening, it becomes necessary to determine with which field the recording is to be terminated by maintaining the relationship between the odd and even fields and the azimuth heads constant, so that the recording is started from a field continuous with the field with which the previous recording is terminated. An another alternative, a time lag of 0.27 seconds may be provided at the starting point and the terminal point of the recording. In this case, gate control is carried out so that the recording signal is supplied to the heads 43 and 44 for a range in which the respective recording track loci of the heads 43 and 44 connect. A recording track locus continuous with the previously recorded track locus may be obtained, by feeding the magnetic tape back by a quantity corresponding to 0.54 ($=0.27 \times 2$) seconds after termination of the recording in this case.

Further, the present invention is not limited to these embodiments, but various variations and modifications may be made without departing from the scope of the present invention.

What is claimed is:

1. A video signal recording apparatus comprising:
   a guide drum having an outer peripheral surface;
   guiding means for guiding a magnetic tape around a predetermined angular range of ($360°-\beta$), of the outer peripheral surface of said guide drum, where $\beta$ is a small angle; and
   a main head and a sub-head mounted on said guide drum for scanning over and recording a composite video signal on the magnetic tape which is guided by said guiding means,
   said main head and said sub-head being separated by an angle $\alpha$ which is slightly larger than the angle $\beta$, and being mounted on said guide drum at two height positions which are separated by a distance d, said main head scanning over said magnetic tape to record a signal by forming first track parts in a first region along the width direction of the magnetic tape, said first track parts being formed obliquely with respect to the longitudinal direction of the magnetic tape, said sub-head scanning over said magnetic tape to record a signal by forming second track parts in a second region along the width direction of the magnetic tape, said second track parts being formed obliquely with respect to the longitudinal direction of the magnetic tape, said second region being different from said first region, said angle α and said distance d having values such that a first predetermined part among said first track parts is continuously end-to-end adjacent a second predetermined track part among said second track parts along an extension of said second predetermined track part, and one track which is made up of said first predetermined track part and said continuous second predetermined track part is equivalent to a standard track of one field of a composite video signal.

2. A video signal recording apparatus as claimed in claim 1 in which said distance d is a value so that said second predetermined track part and said first predetermined track part which are continuously adjacent along said second predetermined track part have a signal of the same type of field recorded thereon, said type of field being either an odd field or an even field of said composite video signal.

3. A video signal recording apparatus as claimed in claim 2 in which sad distance d is selected to a value so that an odd number of tracks exist between tracks separated by a distance d along the track width direction, that is, so that said distance d is an even multiple of a track pitch.

4. A video signal recording apparatus as claimed in claim 1 in which said distance d is a value so that signals within the vertical blanking period of said composite video signal are recorded on substantially said second track parts, and a video information signal of said composite video signal is recorded on substantially said first track parts.

5. A video signal recording apparatus as claimed in claim 1 in which said main head and said sub-head respectively have two kinds of head gaps separated along the scanning direction, at least one kind of said head gaps has an azimuth angle, and said apparatus further comprises a signal switching and supplying circuit for switching and supplying a recording signal to the respective head gaps of said main head and said sub-head, so that said second predetermined track part and said first predetermined track part continuous adjacent therewith along the extension of said second predetermined track part are formed by said main and sub-heads having the same kind of head gap, and one track which is equivalent to said continuous standard track and is made up of said first predetermined track part and said second predetermined track part, is formed by said main and sub-heads having one of the two kinds of head gaps and a track adjacent to said one track is formed by said main and sub-head having the other of the two kinds of head gaps.

6. A video signal recording apparatus as claimed in claim 5 in which said two kinds of head gaps of said main and sub-heads have azimuth angles of mutually different directions.

7. A video signal recording apparatus as claimed in claim 5 in which adjacent track parts of said first track parts and adjacent track parts of said second track parts are respectively formed in contiguous contact with each other.

8. A video signal recording apparatus as claimed in claim 5 in which said signal switching and supplying circuit comprises a delay circuit for compensating for a time difference which is dependent on a gap between said two kinds of head gaps.

* * * * *

UNITED STATES PATENT AND TRADEMARK OFFICE
CERTIFICATE OF CORRECTION

PATENT NO. : 4,517,609
DATED : May 14, 1985
INVENTOR(S) : Ota Yoshihiko

It is certified that error appears in the above-identified patent and that said Letters Patent is hereby corrected as shown below:

Claim 1, Column 13, Line 15, after "predetermined"

insert the word -- track --

Signed and Sealed this

Fifteenth Day of October 1985

[SEAL]

Attest:

Attesting Officer

DONALD J. QUIGG

Commissioner of Patents and Trademarks—Designate